United States Patent
Baptist et al.

(10) Patent No.: US 10,969,972 B2
(45) Date of Patent: *Apr. 6, 2021

(54) VALIDATING RESTRICTED OPERATIONS ON A CLIENT USING TRUSTED ENVIRONMENTS

(71) Applicant: International Business Machines Corporation, Armonk, NY (US)

(72) Inventors: Andrew D. Baptist, Mt. Pleasant, WI (US); Bart R. Cilfone, Marina del Rey, CA (US); Greg R. Dhuse, Chicago, IL (US); Wesley B. Leggette, Chicago, IL (US); Manish Motwani, Chicago, IL (US); Jason K. Resch, Chicago, IL (US); Ilya Volvovski, Chicago, IL (US); Ethan S. Wozniak, Park Ridge, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/527,534

(22) Filed: Jul. 31, 2019

(65) Prior Publication Data
US 2019/0354294 A1    Nov. 21, 2019

Related U.S. Application Data

(63) Continuation of application No. 15/628,116, filed on Jun. 20, 2017, now Pat. No. 10,534,548.

(51) Int. Cl.
*G06F 15/173* (2006.01)
*G06F 3/06* (2006.01)
*G06F 11/10* (2006.01)

(52) U.S. Cl.
CPC ............ *G06F 3/0619* (2013.01); *G06F 3/067* (2013.01); *G06F 3/0643* (2013.01); *G06F 11/1076* (2013.01)

(58) Field of Classification Search
CPC ...... G06F 3/0619; G06F 3/0643; G06F 3/067; G06F 11/1076
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Sm A Rahman
(74) *Attorney, Agent, or Firm* — James Nock; Andrew D. Wright; Roberts Calderon Safran & Cole, P.C.

(57) ABSTRACT

A computing device of a dispersed storage network includes a processing module operable to receive a plurality of requests regarding writing a plurality of data objects to storage units from a plurality of user computing devices. The processing module is further operable to activate a verification process to verify a content format verification code provided by a user computing device for a request regarding writing a data object, activate a signature process to sign the content format verification code with a trusted certificate to produce a signed content format verification code, send the trusted certificate and a signed content format verification code identification to a dispersed storage (DS) processing unit, receive a verification message indicating that the content format verification code identifies a correct format for the data object, and send the data object in the correct format (Continued)

to the DS processing unit for dispersed storage error encoding and storage.

12 Claims, 8 Drawing Sheets

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 6,904,416 B2* | 6/2005 | Nassiri | G06Q 20/401 705/51 |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 7,970,743 B1 | 6/2011 | Kilday | |
| 8,347,277 B2* | 1/2013 | Pai | G06F 21/64 717/140 |
| 10,534,548 B2 | 1/2020 | Baptist et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0196108 A1* | 10/2003 | Kung | H04L 63/105 726/6 |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2009/0177704 A1 | 7/2009 | Consul | |
| 2009/0282477 A1 | 11/2009 | Chen et al. | |
| 2010/0023524 A1 | 1/2010 | Gladwin et al. | |
| 2010/0274859 A1* | 10/2010 | Bucuk | H04L 67/104 709/206 |
| 2011/0125999 A1* | 5/2011 | Cilfone | G06F 3/0619 713/150 |
| 2014/0059023 A1 | 2/2014 | Freeman | |
| 2014/0189852 A1 | 7/2014 | Swingler et al. | |
| 2016/0134623 A1 | 5/2016 | Roth et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

(56) References Cited

OTHER PUBLICATIONS

Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
List of IBM Patents or Patent Applications Treated as Related, dated Jul. 22, 2020, 1 page.

\* cited by examiner distributed, or dispersed, storage network (DSN) 10

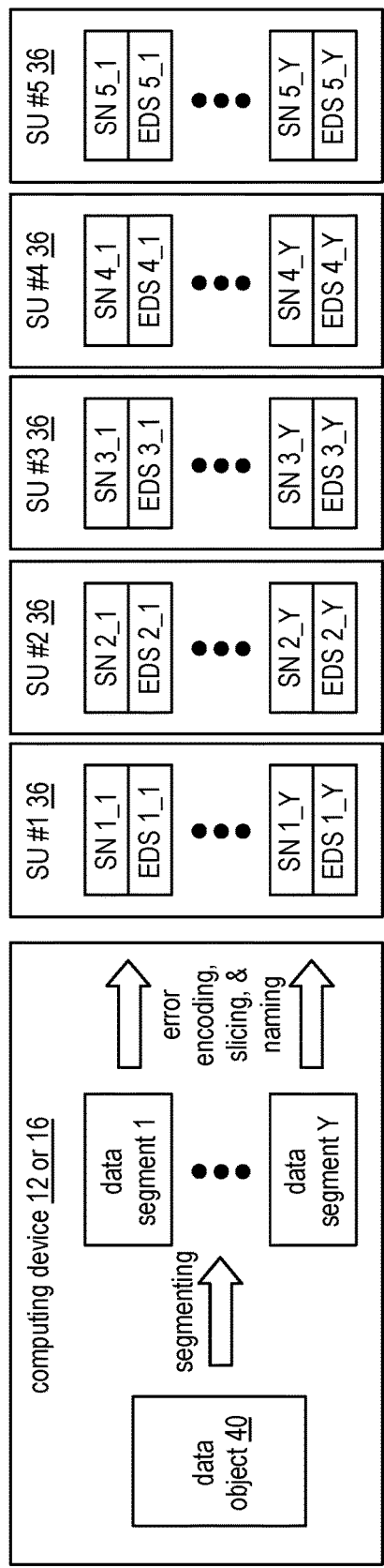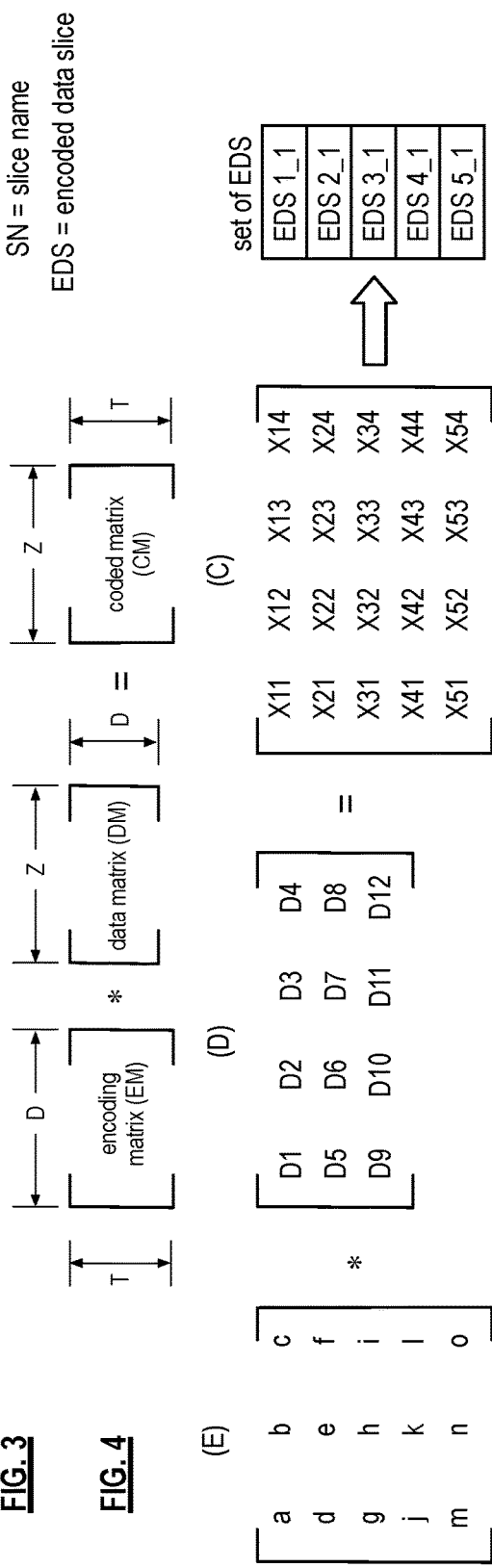

VALIDATING RESTRICTED OPERATIONS ON A CLIENT USING TRUSTED ENVIRONMENTS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage. As is further known, storage systems may require different content formatting for different types of content data (e.g., audio, video, image files, etc.).

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
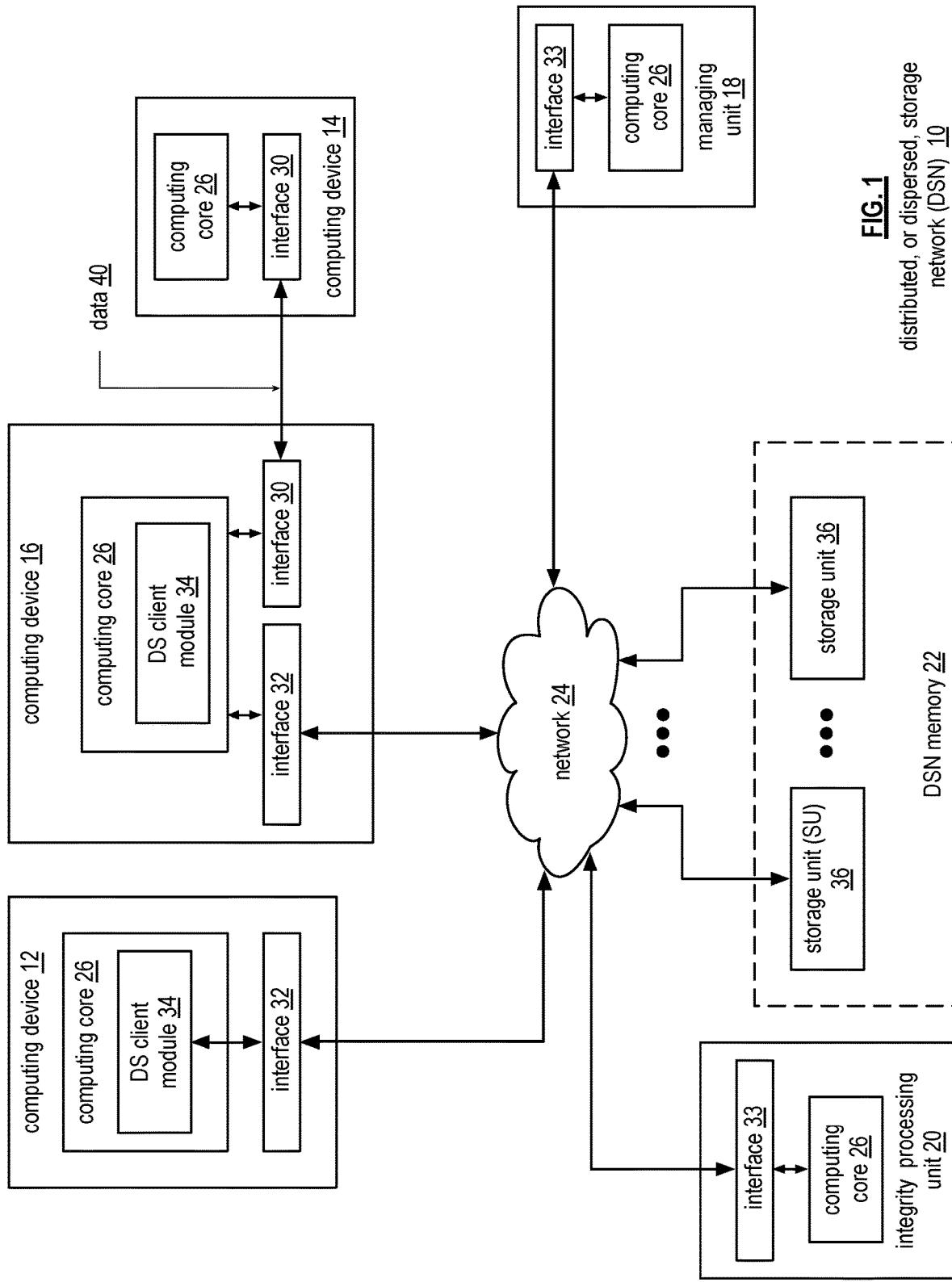
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
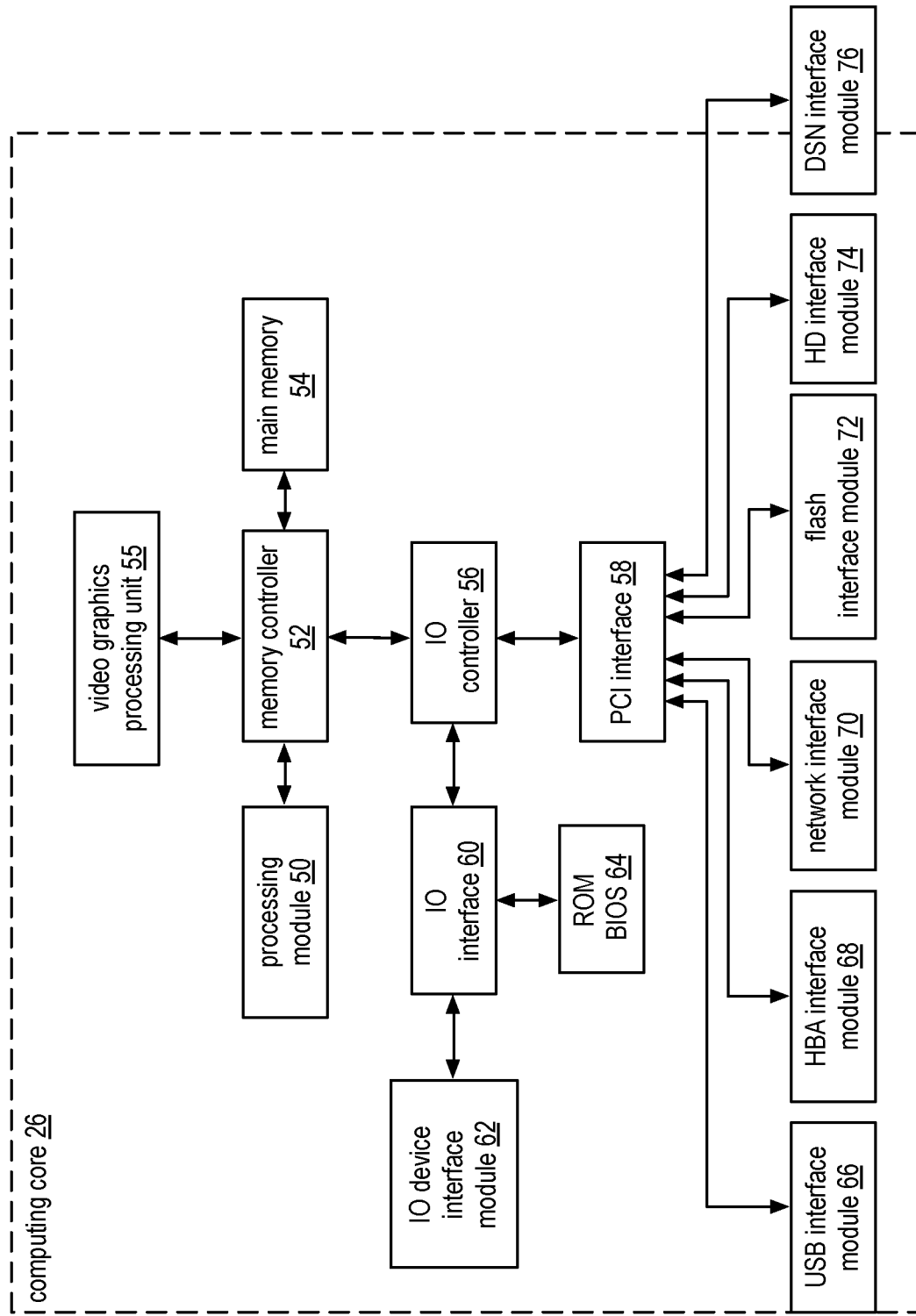
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
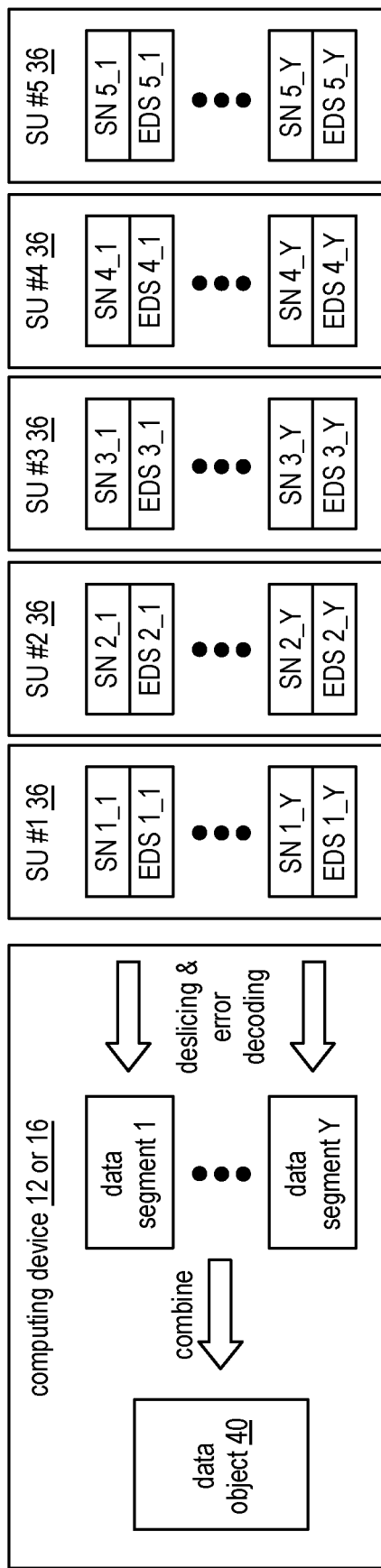
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
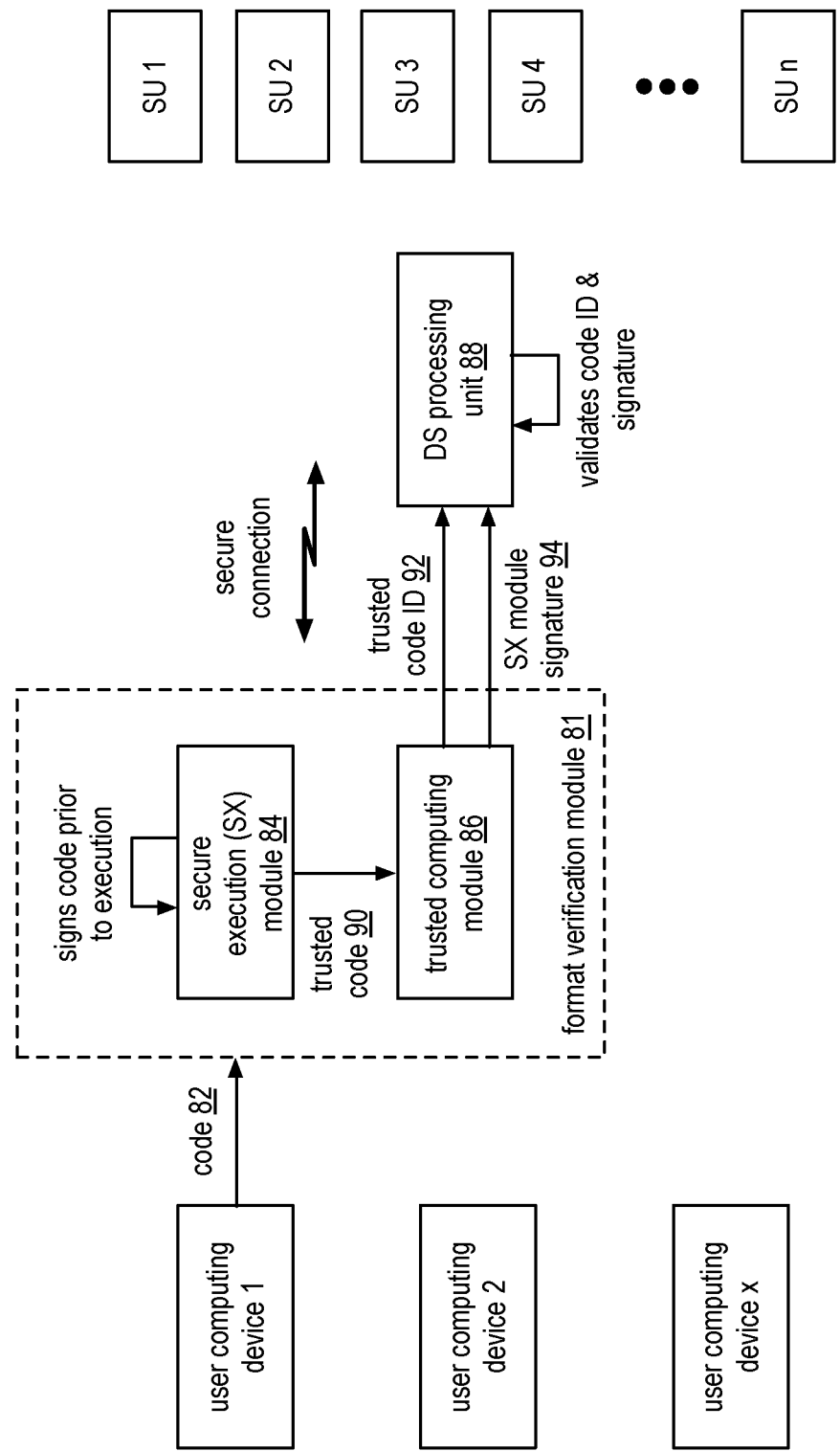
FIG. 9A is a schematic block diagram of another embodiment of the DSN in accordance with the present invention.
Figure 9B:
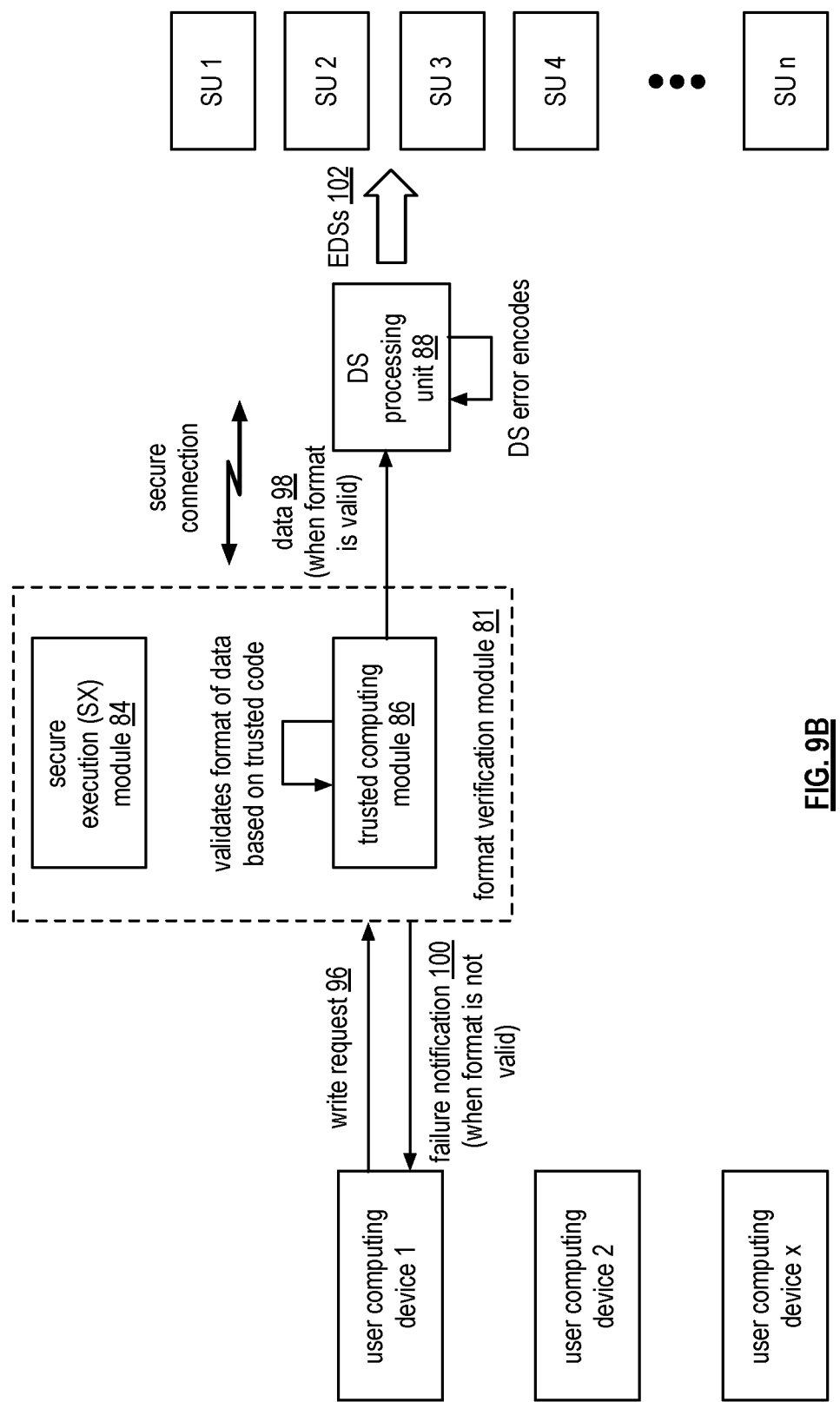
FIG. 9B is a schematic block diagram of another embodiment of the DSN in accordance with the present invention.

FIGS. 9A and 9B are a schematic block diagram of another embodiment of the dispersed storage network (DSN) that illustrate an example of content verification. In both Figures, the DSN includes a plurality of user computing devices 1-x (e.g., client devices), a format verification module 81, a dispersed storage (DS) processing unit 88, and a set of storage units (SUs 1-n). The format verification module 81 operates to ensure the appropriate content formatting of data prior to storage in the DSN. The format verification module 81 includes a secure execution module 84, and a trusted computing module 86. The secure execution module 84 is trusted by the DS processing unit 88 and may be a standalone unit as shown or it may be integrated into the trusted computing module 86, a managing unit, or the DS processing unit 88. The trusted computing module 86 may be a standalone unit as shown or it may be integrated into a managing unit, or the DS processing unit 88. The storage units of the DSN may be a content warehouse that requires data content to be in a particular content format prior to storage. The content format includes one or more of a plurality of audio formats, a plurality of video formats, a plurality of image formats, and a clean text format that is free of malware. For example, the content warehouse may require music files to be in .mp3 files, video files to be in mpeg 4, and images to be in .png format. To ensure that the data is in the correct format prior to storage, the DS processing unit 88 requires proof from the user computing device that the format is correct and that that determination can be trusted. As another example, to ensure that the data is free of detected malware (e.g., viruses, trojan horse programs, worms, etc.) the DS processing unit 88 will require proof from the user computing device that the data is in a clean text format that is free of malware and that that determination can be trusted. The format verification module 81 is also operable to attest to other properties of the data such as whether the data is clear of copyright violating content and other such checks.

In an example of operation, as shown in FIG. 9A, user computing device 1 sends a content format verification code 82 regarding the content formatting of data to the secure execution module 84 of the format verification module 81. Alternatively, or in addition to, another content format verification code regarding other data is sent by another computing device of the plurality of computing devices 1-*x*. The content format verification code 82 may be sent with or without a write request regarding the data. If a write request is sent without the content format verification code 82, the format verification module 81 sends a request for the content format verification code to computing device 1. Upon receiving the content format verification code 82, the secure execution module 84 signs the content format verification code 82 with a secure execution module signature 94 (e.g., a trusted certificate) to produce a trusted content format verification code 90 (i.e., a signed content format verification code). The secure execution module signature 94 may be any one of an asynchronous key pair, key pair chains, a public key infrastructure (PKI), and a GNU Privacy Guard (GPG) key, or any signing mechanism with a root of trust trusted by the DS processing unit.

The secure execution module 84 then sends the trusted content format verification code 90 to the trusted computing module 86. The trusted computing module 86 then establishes a secure connection with the DS processing unit 88. The secure connection is confidential, provides integrity, and resilience against man in the middle attacks. For example, the secure connection may be established with a Transport Layer Security (TLS) session using a Transmission Control Protocol (TCP) that the secure execution module 84 allows the trusted content format verification code 90 to establish via the trusted computing module 86, a negotiated environment, or other such mechanism.

The trusted computing module 86 sends the secure execution module signature 94 and a trusted content format verification code identification (ID) 92 to the DS processing unit 88. The trusted content format verification code ID 92 may be a class name and version, or other such known string. The DS processing unit 88 then verifies that the secure execution module signature 94 and the trusted content format verification code ID 92 indicate that the content format verification code identifies a correct format for the data and that it can be trusted. If the trusted computing device does not establish a secure connection with the DS processing unit 88, the DS processing unit 88 is still able to verify the secure execution module signature 94 and the trusted content format verification code ID 92. For example, when no secure connection exists, the DS processing unit 88 can assert through the mathematical properties of the secure execution module signature 94 that only a valid secure execution module 84 could have produced the secure execution module signature 94. The next steps in ensuring the appropriate content formatting of the data prior to storage in the DSN are discussed with reference to FIG. 9B.

Continuing with the example in FIG. 9B, after the trusted computing module 86 sends the secure execution module signature 94 and a trusted content format verification code ID 92 to the DS processing unit 88 as discussed with reference to FIG. 9A, the DS processing unit 88 will verify that the secure execution module signature 94 and a trusted content format verification code ID 92 indicate that the content format verification code identifies a correct format for the data and that it can be trusted. When the DS processing unit does not verify the secure execution module signature 94 and the trusted content format verification code ID 92, the trusted computing module 86 will send user computing device 1 a failure notification 100.

When the DS processing unit verifies that the secure execution module signature 94 and the trusted content format verification code ID 92 indicate that the content format verification code identifies a correct format for the data and that it can be trusted, user computing device 1 will send a write request 96 regarding the data to the trusted computing module 86 if the write request 96 was not initially sent along with the content format verification code. The trusted computing module 86 will then determine whether the data of the write request 96 is in the appropriate content format based on the trusted content verification code. When the data of the write request 96 is in the appropriate content format, the trusted computing module 86 will send the data 98 to the DS processing unit for dispersed storage error encoding to produce a plurality of error encoded data slices (EDSs) 102. The DS processing unit will then send the EDSs 102 to the set of storage units of the DSN for storage therein. When the data of the write request 96 is not in the appropriate content format, the trusted computing module 86 will send a failure notification 100 to user computing device 1. Alternatively, the trusted computing module 86 may send a request to send another content format verification code to computing device 1.

Figure 10:
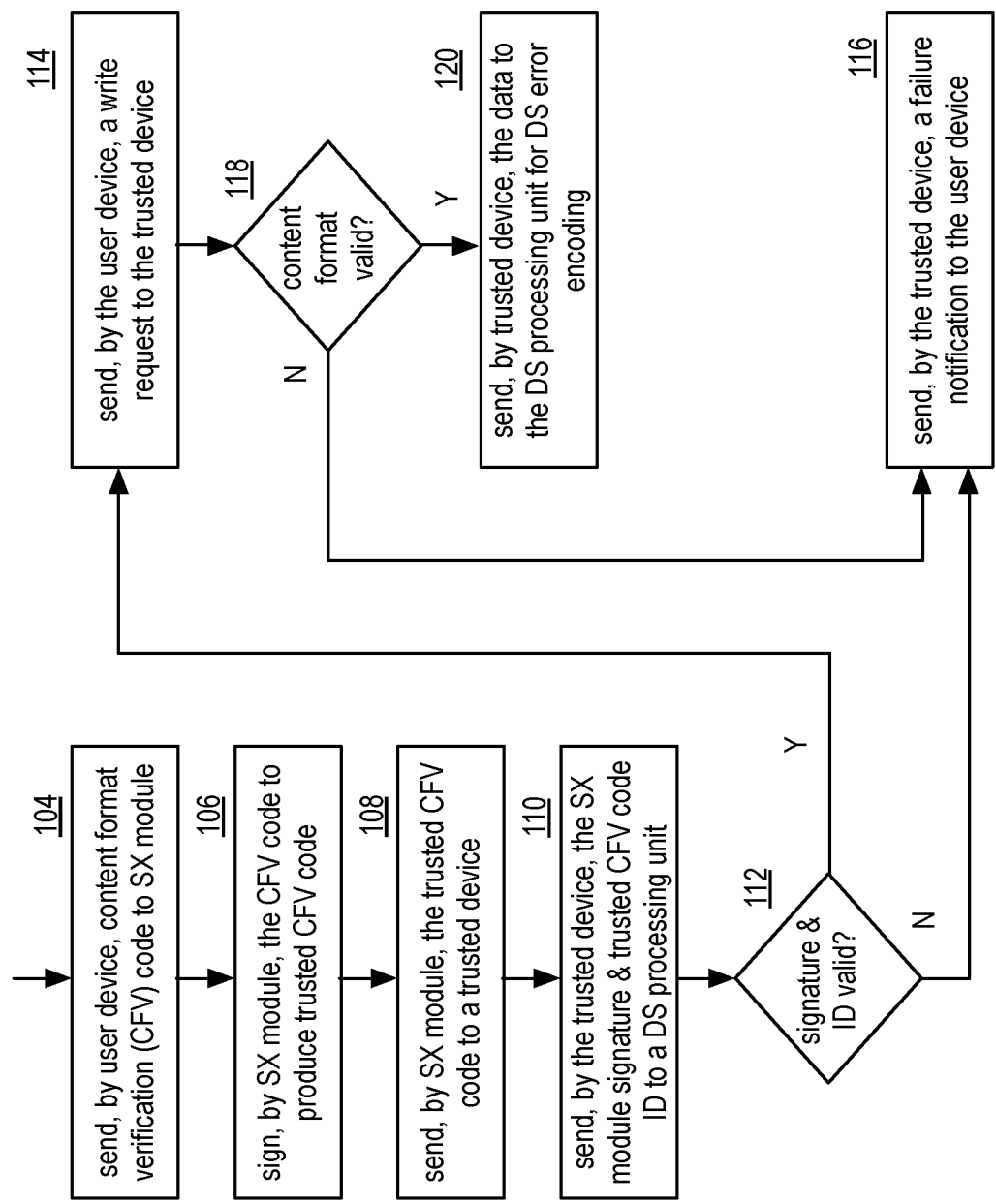
FIG. 10 is a logic diagram of an example of a method of ensuring appropriate content formatting of data prior to storage in accordance with the present invention.

FIG. 10 is a logic diagram of an example of a method of ensuring appropriate content formatting of data prior to storage. The method begins with step 104 where a user computing device of a plurality of user computing devices of a dispersed storage network (DSN) sends a content format verification code regarding the content formatting of the data to a secure execution module of a format verification module of the DSN. The secure execution module is trusted by a DS processing unit of the DSN and may be a standalone unit or it may be integrated into a trusted computing module of the format verification module, a managing unit, or the DS processing unit.

The content format includes one or more of a plurality of audio formats, a plurality of video formats, a plurality of image formats, and a clean text format that is free of malware. For example, a set of storage units of the DSN may be a content warehouse that may require music files to be in .mp3 files, video files to be in mpeg 4, and images to be in .png format. As another example, the DS processing unit will require proof from the user computing device that the data is in a clean text format that is free of malware (e.g., viruses, trojan horse programs, worms, etc.) and that that determination can be trusted. The format verification module is also operable to attest to other properties of the data such as whether the data is clear of copyright violating content and other such checks. The content format verification code may be sent with or without a write request regarding the data. If a write request is sent without the content format verification code, the format verification module may send a request for the content format verification code to the user computing device.

The method continues with step 106 where the secure execution module signs the content format verification code with a secure execution module signature to produce a trusted content format verification code. The secure execution module signature may be any one of an asynchronous key pair, key pair chains, a public key infrastructure (PKI), and a GNU Privacy Guard (GPG) key, or any signing mechanism with a root of trust trusted by the DS processing unit.

The method continues with step 108 where the secure execution module sends the trusted content format verification code to the trusted computing module of the format verification module of the DSN. The trusted computing module may be a standalone unit or it may be integrated into a managing unit or the DS processing unit. The method continues with step 110 where the trusted computing module sends the secure execution module signature and a trusted content format verification code identification (ID) to the DS processing unit for verification via a secure connection. The secure connection must be confidential, must provide integrity, and must provide resilience against man in the middle attacks. For example, the secure connection may be established with a Transport Layer Security (TLS) session using a Transmission Control Protocol (TCP) that the secure execution module allows the trusted content format verification code to establish via the trusted computing module, a negotiated environment, or other such mechanism. The trusted content format verification code ID may be a class name and version, or other such known string.

The method continues with step 112 where the DS processing unit verifies that the secure execution module signature and the trusted content format verification code ID indicate that the content format verification code identifies a correct format for the data and that it can be trusted. If the trusted computing device does not establish a secure connection with the DS processing unit, the DS processing unit is still able to verify the secure execution module signature and the trusted content format verification code ID. For example, when no secure connection exists, the DS processing unit can assert through the mathematical properties of the secure execution module signature that only a valid secure execution module could have produced the secure execution module signature. When the DS processing unit does not verify the secure execution module signature and the trusted content format verification code ID, the method continues with step 116 where the trusted computing module sends a failure notification to the user computing device. When the DS processing unit does verify the secure execution module signature and the trusted content format verification code ID, the method continues with step 114 where the user computing device sends a write request (if the write request was not sent previously) regarding the data to the trusted computing module.

The method continues with step 118 where the trusted computing module determines whether the data of the write request is in the appropriate content format based on the trusted content verification code. When the data of the write request is in the appropriate content format, the method continues with step 120 where the trusted computing module sends the data to the DS processing unit for dispersed storage error encoding. When the data of the write request is not in the appropriate content format, the method continues with step 116 where the trusted computing module sends a failure notification to the user computing device.

Figure 11:
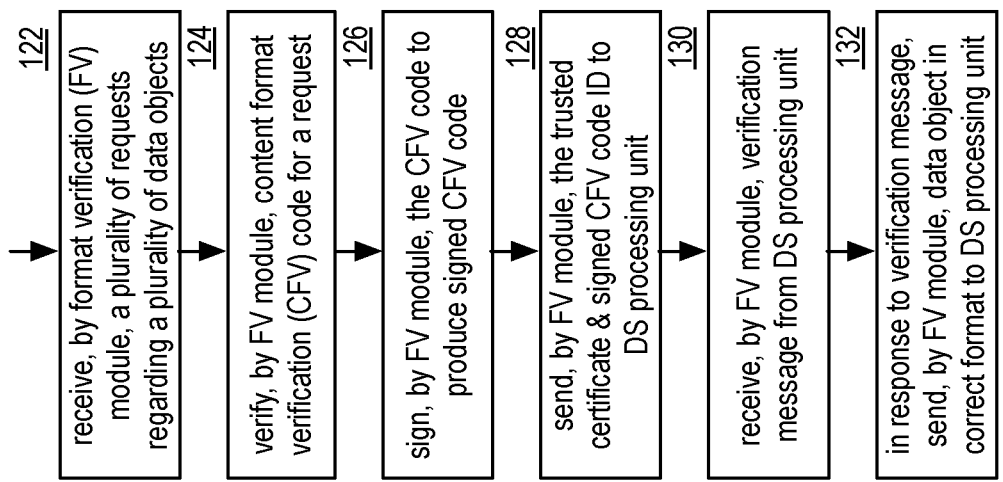
FIG. 11 is a logic diagram of another example of a method of ensuring appropriate content formatting of data prior to storage in accordance with the present invention.

FIG. 11 is a logic diagram of another example of a method of ensuring appropriate content formatting of data prior to storage in accordance with the present invention. The method begins with step 122 where a format verification module of a dispersed storage network (DSN) receives a plurality of requests regarding writing a plurality of data objects to storage units of the DSN from a plurality of computing devices of the DSN. The method continues with step 124 where the format verification module verifies a content format verification code provided by a computing device of the plurality of computing devices for a request of the plurality of requests regarding writing a data object of the plurality of data objects. The content format verification code indicates a particular formatting of the data object. The content format includes one or more of a plurality of audio formats, a plurality of video formats, a plurality of image formats, and a clean text format that is free of malware. For example, a set of storage units of the DSN may be a content warehouse that may require music files to be in .mp3 files, video files to be in mpeg 4, and images to be in .png format. As another example, the DS processing unit will require proof from the user computing device that the data is in a clean text format that is free of malware (e.g., viruses, trojan horse programs, worms, etc.) and that that determination can be trusted. The format verification module is also operable to attest to other properties of the data such as whether the data is clear of copyright violating content and other such checks. The content format verification code may be sent with or without a write request regarding the data. If a write request is sent without the content format verification code, the format verification module may send a request for the content format verification code to the user computing device.

The method continues with step 126 where the format verification module signs the content format verification code with a trusted certificate to produce a signed content format verification code. The trusted certificate may be any one of an asynchronous key pair, key pair chains, a public key infrastructure (PKI), and a GNU Privacy Guard (GPG) key, or any signing mechanism with a root of trust trusted by a dispersed storage (DS) processing unit of the DSN. The method continues with step 128 where the format verification module sends the trusted certificate and a signed content format verification code identification (ID) to the DS processing unit via a secure connection. The secure connection must be confidential, must provide integrity, and must provide resilience against man in the middle attacks. For example, the secure connection may be established with a Transport Layer Security (TLS) session using a Transmission Control Protocol (TCP) that the secure execution module allows the trusted content format verification code to establish via the trusted computing module, a negotiated environment, or other such mechanism. The content format verification code ID may be a class name and version or any known string. If the format verification module does not establish a secure connection with the DS processing unit, the DS processing unit is still able to verify the trusted certificate and the signed content format verification code ID. For example, when no secure connection exists, the DS processing unit can assert through the mathematical properties of the trusted certificate that only a valid format verification module could have produced the trusted certificate.

The method continues with step 130 where the format verification module receives a verification message from the DS processing unit. The verification message indicates that the content format verification code identifies a correct format for the data object. If the format verification module received the content format verification code without a write request, the format verification module will, after receiving the verification message, send a request for a write request regarding the data object to the computing device. If, instead of the verification message, the format verification module receives an invalid format message from the DS processing unit, the format verification module will send a failure notification to the computing device. Alternatively, in response to receiving the invalid format message, the format verification module may send a request to send another content format verification code to the computing device.

When the verification message is received, the method continues with step 132 where in response to the verification message, the format verification module sends the data object in the correct format to the DS processing unit for dispersed storage error encoding and subsequent storage thereof.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device of a dispersed storage network (DSN), the computing device comprises:
   an interface;
   memory; and
   a processing module operably coupled to the memory and the interface, wherein the processing module is operable to:
   receive, via the interface, a plurality of requests regarding writing a plurality of data objects to storage units of the DSN from a plurality of user computing devices of the DSN;
   activate a verification process to verify a content format verification code provided by a user computing device of the plurality of user computing devices for a request of the plurality of requests regarding writing a data object of the plurality of data objects, wherein the content format verification code indicates a particular formatting of the data object;
   activate a signature process to sign the content format verification code with a trusted certificate to produce a signed content format verification code;
   send, via the interface, the trusted certificate and a signed content format verification code identification (ID) to a dispersed storage (DS) processing unit of the DSN;
   receive, via the interface, a verification message from the DS processing unit, wherein the verification message indicates that the content format verification code identifies a correct format for the data object; and
   in response to the verification message, send, via the interface, the data object in the correct format to the DS processing unit for dispersed storage error encoding and subsequent storage thereof.

2. The computing device of claim 1, wherein the processing module is further operable to receive the request of the plurality of requests by:
   receiving, via the interface, a write request regarding the data object from the user computing device; and
   sending, via the interface, a request for the content format verification code to the user computing device.

3. The computing device of claim 1, wherein the processing module is further operable to:
   receive, via the interface, the content format verification code as the request; and
   when the verification message is received, send, via the interface, a request for a write request regarding the data object to the user computing device.

4. The computing device of claim 1, wherein the trusted certificate comprises one of:
   an asynchronous key pair;
   key pair chains;
   a public key infrastructure (PKI); and
   a GNU Privacy Guard (GPG) key.

5. The computing device of claim 1, wherein the signed content format verification code ID comprises one of:
   a class name and version; and
   a known string.

6. The computing device of claim 1, wherein the processing module is further operable to:
   receive, via the interface, an invalid format message; and
   in response to the invalid format message, send, via the interface, a failure notification to the user computing device.

7. The computing device of claim 1, wherein the processing module is further operable to:
   receive, via the interface, an invalid format message; and
   in response to the invalid format message, send, via the interface, a request to send another content format verification code to the user computing device.

8. The computing device of claim 1, wherein the processing module is further operable to:
- activate a second verification process to verify a second content format verification code provided by a second user computing device of the plurality of user computing devices for a second request of the plurality of requests regarding writing a second data object of the plurality of data objects, wherein the second content format verification code indicates a particular formatting of the second data object;
- activate a second signature process to sign the second content format verification code with the trusted certificate to produce a second signed content format verification code;
- send, via the interface, the trusted certificate and a second signed content format verification code ID to the DS processing unit;
- receive, via the interface, a second verification message from the DS processing unit, wherein the second verification message indicates that the second content format verification code identifies a correct format for the second data object; and
- in response to the second verification message, send, via the interface, the second data object in the correct format to the DS processing unit for dispersed storage error encoding and subsequent storage thereof.

9. The computing device of claim 1, wherein the content format comprises one or more of:
- a plurality of audio formats;
- a plurality of video formats;
- a plurality of image formats; and
- a clean text format that is free of malware.

10. The computing device of claim 1, wherein the activating the verification process includes sending, via the interface, a request to perform the verification process to a secure execution module of the DSN.

11. The computing device of claim 1, wherein the activating the signature process includes sending, via the interface, a request to sign the content format verification code to a secure execution module of the DSN.

12. The computing device of claim 11, wherein the activating the signature process further includes sending, via the interface, a request to the secure execution module to send the signed trusted content format verification code to a trusted computing device of the DSN, wherein the trusted computing device sends the trusted certificate and the signed content format verification code ID to the DS processing unit of the DSN.

* * * * *